(12) United States Patent
Wachtfogel et al.

(10) Patent No.: US 6,980,650 B2
(45) Date of Patent: Dec. 27, 2005

(54) SYSTEM FOR PROVIDING KEYS

(75) Inventors: Reuven Wachtfogel, Jerusalem (IL); Yair Mirsky, Jerusalem (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 10/760,952

(22) Filed: Jan. 20, 2004

(65) Prior Publication Data

US 2005/0089170 A1 Apr. 28, 2005

Related U.S. Application Data

(60) Provisional application No. 60/514,659, filed on Oct. 27, 2003.

(51) Int. Cl.[7] ................................................ H04L 9/14
(52) U.S. Cl. ........................................ 380/42; 380/207
(58) Field of Search ................................ 380/200, 201, 380/211, 42, 207

(56) References Cited

U.S. PATENT DOCUMENTS

| | | | |
|---|---|---|---|
| 5,282,249 | A | 1/1994 | Cohen et al. |
| 5,481,609 | A | 1/1996 | Cohen et al. |
| 6,178,242 | B1 | 1/2001 | Tsuria |
| 2003/0035543 | A1 * | 2/2003 | Gillon et al. ............... 380/270 |
| 2003/0043847 | A1 | 3/2003 | Haddad |
| 2003/0103055 | A1 | 6/2003 | DaSilva |
| 2003/0190157 | A1 | 10/2003 | Aubry et al. |
| 2003/0228018 | A1 * | 12/2003 | Vince .......................... 380/277 |
| 2004/0062398 | A1 * | 4/2004 | Unger ......................... 380/277 |

FOREIGN PATENT DOCUMENTS

| | | |
|---|---|---|
| WO | WO 00/01149 | 1/2000 |
| WO | WO 01/35669 A1 | 5/2001 |
| WO | WO 03/010970 | 2/2003 |

OTHER PUBLICATIONS

H. Schulzrinne, A. Rao, R. Lanphier, "Real Time Streaming Protocol (RTSP)" (MMUSIC WG, Columbia U/Netscape/Real Networks, Feb. 2, 1998).

European Telecommunications Standards Institute, "Digital Video Broadcasting (DVB); Support for use of scrambling and Conditional Access (CA) within digital broadcasting systems" (ETSI Technical Report 289, Oct. 1996).

International Standard, "Information technology—Generic coding of moving pictures and associated audio information: Video" (ISO/IEC 13818-2, Second edition, Dec. 15, 2000).

* cited by examiner

Primary Examiner—Gregory Morse
Assistant Examiner—Andrew L. Nalvern
(74) Attorney, Agent, or Firm—Welsh & Katz, Ltd.

(57) ABSTRACT

A method for providing keys for descrambling scrambled content, the scrambled content being divided into frames, the method including: identifying a plurality of frames to be descrambled; for each frame of the plurality of frames, identifying a key period associated with a key for descrambling the frame; and for at least one frame f of the plurality of frames, substituting a substitute frame g for the frame f, the substitute frame g being chosen in order to reduce a total number of key periods associated with keys for descrambling all of the plurality of frames. Related apparatus and methods are also provided.

20 Claims, 6 Drawing Sheets

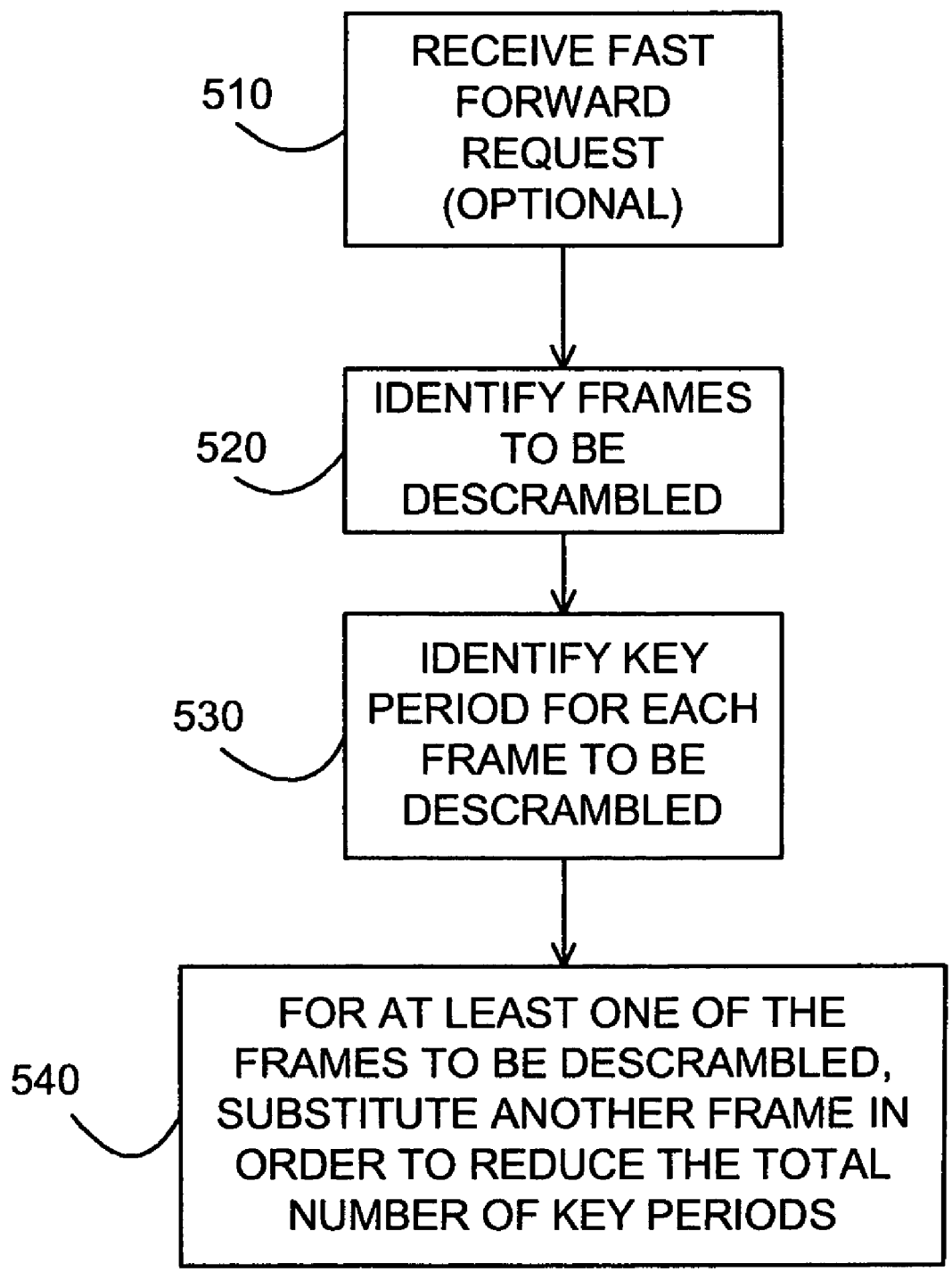

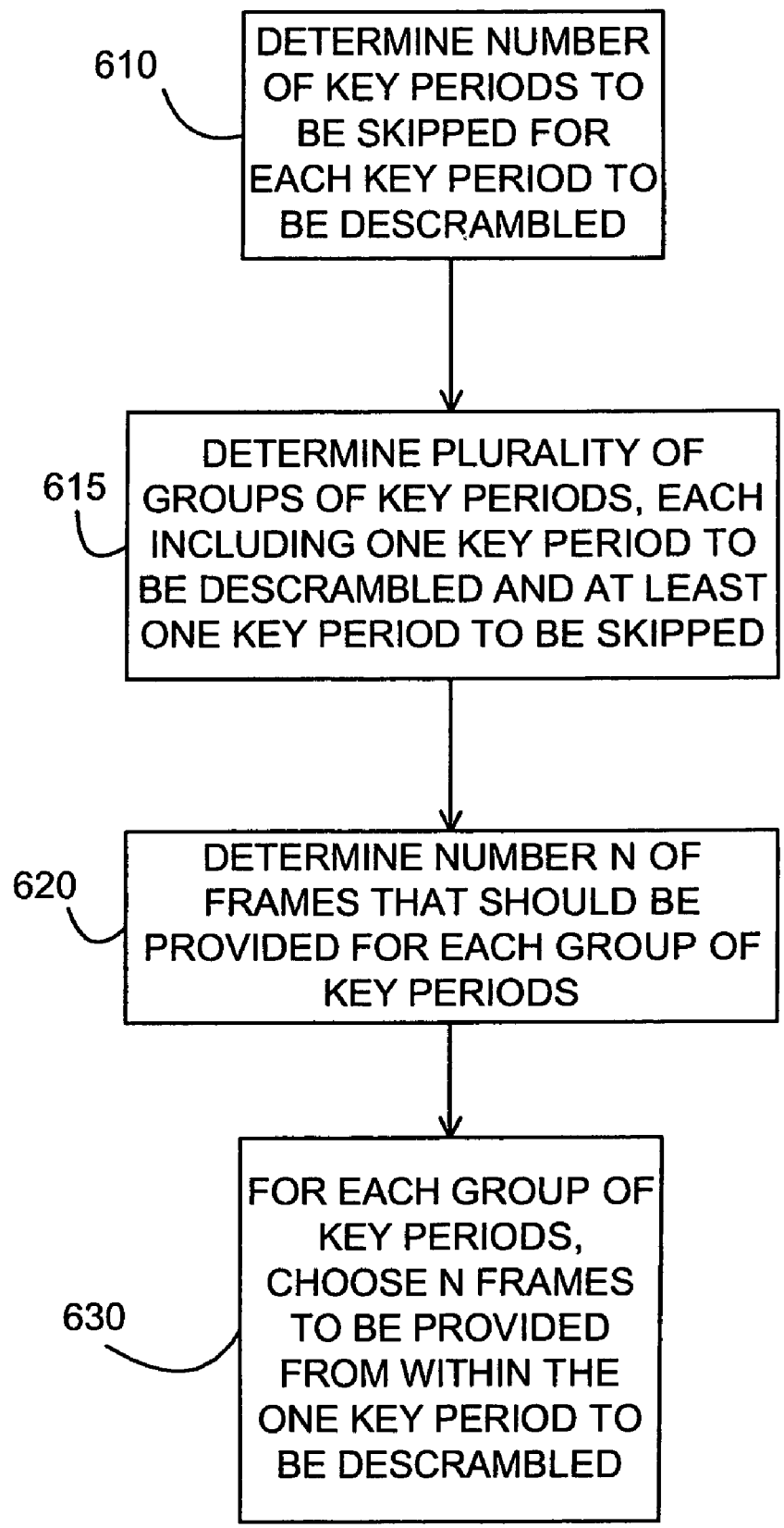

SYSTEM FOR PROVIDING KEYS

The present application claims the benefit of the filing date of provisional application Ser. No. 60/514,659 filed on 27 Oct. 2003.

FIELD OF THE INVENTION

The present invention relates to conditional access in general, and particularly but not exclusively to conditional access systems for use with personal video recorders.

BACKGROUND OF THE INVENTION

Systems for scrambling a television data stream are well-known in the art. One such system is described in the following US patents: U.S. Pat. No. 5,282,249 to Cohen et al.; U.S. Pat. No. 5,481,609 to Cohen et al. Scrambled television data streams described in the Cohen et al patents comprise both scrambled data representing television signals and coded control messages, also known as ECMs. The ECMs of Cohen et al comprise, in a coded form, data necessary for generating a control word (CW) which may be used to descramble the scrambled data representing television signals.

Data necessary for generating a control word may comprise all or part of an ECM. In the present specification and claims, for sake of simplicity of description, generation of a control word is sometimes described as taking place based on an ECM, it being appreciated that all or part of an ECM may be used. Data necessary for generating a control word is known in the art to take many different forms and may include, in general, at least any of the following: a control word; an encrypted control word packet which is intended to be decrypted before use; and a seed to a generating function such as, for example, a one-way function which generates the control word upon input of the seed. Control words are also termed "keys"; the terms "control word" and "key", in all of their grammatical forms, are used interchangeably throughout the present specification and claims. Throughout the present specification and claims the terms "control word generating information" and "CW generating information" are used interchangeably to designate data necessary for generating a control word in any appropriate form, as described above.

While the two patents to Cohen et al describe an analog system, that is, a system in which analog television data streams are broadcast to television sets, it is appreciated that similar ECM methods may also be used for digital television data streams. Generally, the scrambling techniques used for scrambling analog television signals such as, for example, the well-known "cut-and-rotate" technique, are chosen for their applicability to analog signals. In scrambling of digital television signals other scrambling techniques, well-known in the art, are used, the techniques being more appropriate to digital signals such as, for example, applying the well-known DES algorithm, the well-known triple-DES algorithm, or the DVB Common Scrambling Algorithm to the digital television signals; it is appreciated that any appropriate scrambling technique may be used.

Methods of transmitting a scrambled digital signal, including ECMs, are described in the MPEG-2 standard, ISO/IEC 13818-6, 12 Jul. 1996 and subsequent editions. In general, methods of transmitting a scrambled digital signal, including ECMs, are well known. Some systems use a composite signal, that is, an analog or digital signal including a plurality of components. Typically the plurality of components includes both a scrambled television signal component and an ECM component, the ECM component comprising a plurality of ECMs. Prior art references which discuss examples of this type of signal include the following: DVB ETR289, "Digital Video Broadcasting (DVB): Support for use of scrambling and conditional access (CA) within digital broadcasting systems"; and DVB SIM061, "Technical specification of DVB-Simulcrypt", 1 Apr. 1997.

The system of Cohen et al and other systems described in the art share a feature of broadcasting an ECM synchronous to, generally immediately before or in a data stream parallel to, the actual scrambled broadcast. Typically, the CW or key which can be generated from such an ECM (or from CW generating information comprised therein) is valid for a brief duration known as a "key period". Typically, a key period lasts for a few seconds, such as 8 seconds or 10 seconds. Each key period is associated with a segment of scrambled data or content which can be descrambled using the key associated with that key period. The concept of key period is explained in the above-mentioned DVB ETR289 reference, as well as in Simulcrypt specification ETSI TS 101 197 and Simulcrypt guidelines ETSI TR 102 035.

It is well known in broadcasting to provide many ECMs for each key period so that, for example, if one tunes to a new broadcast program one need not wait for the next key period to begin in order to view the broadcast; rather, one need only wait for the next ECM. Typically, an ECM is broadcast a plurality of times, such as 10 or 20 times, per key period.

When scrambled data is recorded for later descrambling and playback, it is typically only necessary to store one ECM per key period. One example of a system for recording and playing back scrambled data is described in U.S. Pat. No. 6,178,242 to Tsuria, the disclosure of which is hereby incorporated herein by reference.

Another example of a system for recording and playing back scrambled data is described in the following patents and patent applications, the disclosures of which are hereby incorporated herein by reference: PCT Published Patent Application WO 00/01149 of NDS Limited; corresponding European Patent 1 013 088 of NDS Limited; and U.S. patent application Ser. No. 09/515,118 of Wachtfogel et al, assigned to NDS Limited. Such a system is one example of a type of system known in the art as a Personal Video Recorder or PVR.

Playing back a scrambled recorded data stream presents certain challenges, some of which have been addressed in the following patents and published patent applications, the disclosures of which are hereby incorporated herein by reference:

1. PCT Published Patent Application WO 01/35669 of NDS Limited; corresponding European Patent 1 142 340 of NDS Limited; and corresponding U.S. patent application Ser. No. 09/574,096 of Darshan et al, assigned to NDS Limited; and 2. PCT Published Patent Application WO 03/010970 of NDS Limited.

The disclosures of all references mentioned above and throughout the present specification, as well as the disclosures of all references mentioned in those references, are hereby incorporated herein by reference.

SUMMARY OF THE INVENTION

The present invention seeks to provide an improved conditional access system, particularly but not exclusively for use with personal video recorders (PVRs).

The inventors of the present invention believe that a problem may exist when playback of recorded scrambled content, particularly but not exclusively video content, is attempted at high "fast forward" or "fast reverse" speed. Persons skilled in the art will appreciate, in light of the above discussion, that, in normal speed playback, a key for descrambling the scrambled content must be produced for every key period. In fast forward playback, only 1 in every n frames of content must be displayed; however, if n is less than the number of frames in a key period, it is still necessary to produce a key for descrambling the scrambled content for every key period.

When playback is very fast, the necessity of producing keys from ECMs may strain the abilities of the playback system. This is because, in playback of a "live" broadcast stream, only one ECM must be processed to produce a key for each key period; in fast forward playback, by contrast, up to one ECM must be processed for each frame. It will therefore be appreciated that a large number of ECMs must be processed each second during fast forward playback.

In preferred embodiments of the present invention, a substitute frame is chosen for at least one frame which is to be descrambled, in such a way as to reduce the number of different key periods for which a frame is to be descrambled. Thus, the number of ECMs which must be processed to produce keys is also reduced, and the above-described problem is overcome.

The term "render" is used, in all its grammatical forms, throughout the present specification and claims to refer to any appropriate mechanism or method of making content palpable to one or more of the senses. In particular and without limiting the generality of the foregoing, "render" refers not only to display of video content but also to playback of audio content.

There is thus provided in accordance with a preferred embodiment of the present invention a method for providing keys for descrambling scrambled content, the scrambled content being divided into frames, the method including identifying a plurality of frames to be descrambled, for each frame of the plurality of frames, identifying a key period associated with a key for descrambling the frame, and for at least one frame f of the plurality of frames, substituting a substitute frame g for the frame f, the substitute frame g being chosen in order to reduce a total number of key periods associated with keys for descrambling all of the plurality of frames.

Further in accordance with a preferred embodiment of the present invention the method also includes producing one key for each key period.

Still further in accordance with a preferred embodiment of the present invention the method also includes producing exactly one key for each key period.

Additionally in accordance with a preferred embodiment of the present invention the producing includes producing from an ECM.

Moreover in accordance with a preferred embodiment of the present invention the method also includes rendering at least one of the plurality of frames.

Further in accordance with a preferred embodiment of the present invention the rendering includes rendering all of the plurality of frames.

Still further in accordance with a preferred embodiment of the present invention the substituting includes determining a number NK of key periods to be skipped for each key period to be descrambled, NK being greater than or equal to 1, determining a plurality of groups of key periods, each group including one key period to be descrambled and NK key periods to be skipped, determining a number N of frames to be provided from each group of the plurality of groups of key periods, and for each one group of the plurality of groups of key periods, choosing N frames to be provided from within the one key period to be descrambled, which one key period is included in the one group.

Additionally in accordance with a preferred embodiment of the present invention N is greater than or equal to 2.

Moreover in accordance with a preferred embodiment of the present invention the N frames are evenly spaced within the one key period.

There is also provided in accordance with another preferred embodiment of the present invention a method for providing keys for descrambling scrambled content, the scrambled content being divided into frames, the method including identifying a plurality of frames to be descrambled, for each frame of the plurality of frames, identifying a key period associated with a key for descrambling the frame, and for each frame f of the plurality of frames, determining whether to substitute a substitute frame g for the frame f based, at least in part, on a distance between frame g and frame f, and, at least in part, on a goal of reducing a total number of key periods associated with keys for descrambling all of the plurality of frames, and based on a result of the determining, substituting frame g for frame f.

Further in accordance with a preferred embodiment of the present invention the method also includes producing one key for each key period.

Still further in accordance with a preferred embodiment of the present invention the method also includes producing exactly one key for each key period.

Additionally in accordance with a preferred embodiment of the present invention the producing includes producing from an ECM.

Moreover in accordance with a preferred embodiment of the present invention the method also includes rendering at least one of the plurality of frames.

Further in accordance with a preferred embodiment of the present invention the rendering includes rendering all of the plurality of frames.

There is also provided in accordance with another preferred embodiment of the present invention apparatus for providing keys for descrambling scrambled content, the scrambled content being divided into frames, the apparatus including a frame identifier identifying a plurality of frames to be descrambled, a key period identifier operative, for each frame of the plurality of frames, to identify a key period associated with a key for descrambling the frame, and a frame substitutor operative, for at least one frame f of the plurality of frames, to substitute a substitute frame g for the frame f, the substitute frame g being chosen in order to reduce a total number of key periods associated with keys for descrambling all of the plurality of frames.

There is also provided in accordance with yet another preferred embodiment of the present invention apparatus for providing keys for descrambling scrambled content, the scrambled content being divided into frames, the apparatus including a frame identifier identifying a plurality of frames to be descrambled, a key period identifier operative, for each frame of the plurality of frames, to identify a key period associated with a key for descrambling the frame, and a frame substitutor operative, for each frame f of the plurality of frames, to determine whether to substitute a substitute frame g for the frame f based, at least in part, on a distance between frame g and frame f, and, at least in part, on a goal of reducing a total number of key periods associated with keys for descrambling all of the plurality of frames, and, based on a result of the determining, to substitute frame g for frame f.

There is also provided in accordance with still another preferred embodiment of the present invention apparatus for providing keys for descrambling scrambled content, the scrambled content being divided into frames, the apparatus including means for identifying a plurality of frames to be descrambled, means for identifying, for each frame of the plurality of frames, a key period associated with a key for descrambling the frame, and means for substituting, for at least one frame f of the plurality of frames, a substitute frame g for the frame f, the substitute frame g being chosen in order to reduce a total number of key periods associated with keys for descrambling all of the plurality of frames.

There is also provided in accordance with yet another preferred embodiment of the present invention apparatus for providing keys for descrambling scrambled content, the scrambled content being divided into frames, the apparatus including means for identifying a plurality of frames to be descrambled, means for identifying, for each frame of the plurality of frames, a key period associated with a key for descrambling the frame, and means for performing the following for each frame f of the plurality of frames: determining whether to substitute a substitute frame g for the frame f based, at least in part, on a distance between frame g and frame f, and, at least in part, on a goal of reducing a total number of key periods associated with keys for descrambling all of the plurality of frames; and based on a result of the determining, substituting frame g for frame f.

BRIEF DESCRIPTION OF THE DRAWINGS

The present invention will be understood and appreciated more fully from the following detailed description, taken in conjunction with the drawings in which:

FIG. 5 is a simplified flowchart illustration of a preferred method of operation of the system of FIG. 1; and FIG. 6 is a simplified flowchart illustration of a preferred implementation of a portion of the method of FIG. 5.

DETAILED DESCRIPTION OF A PREFERRED EMBODIMENT

Figure 1:
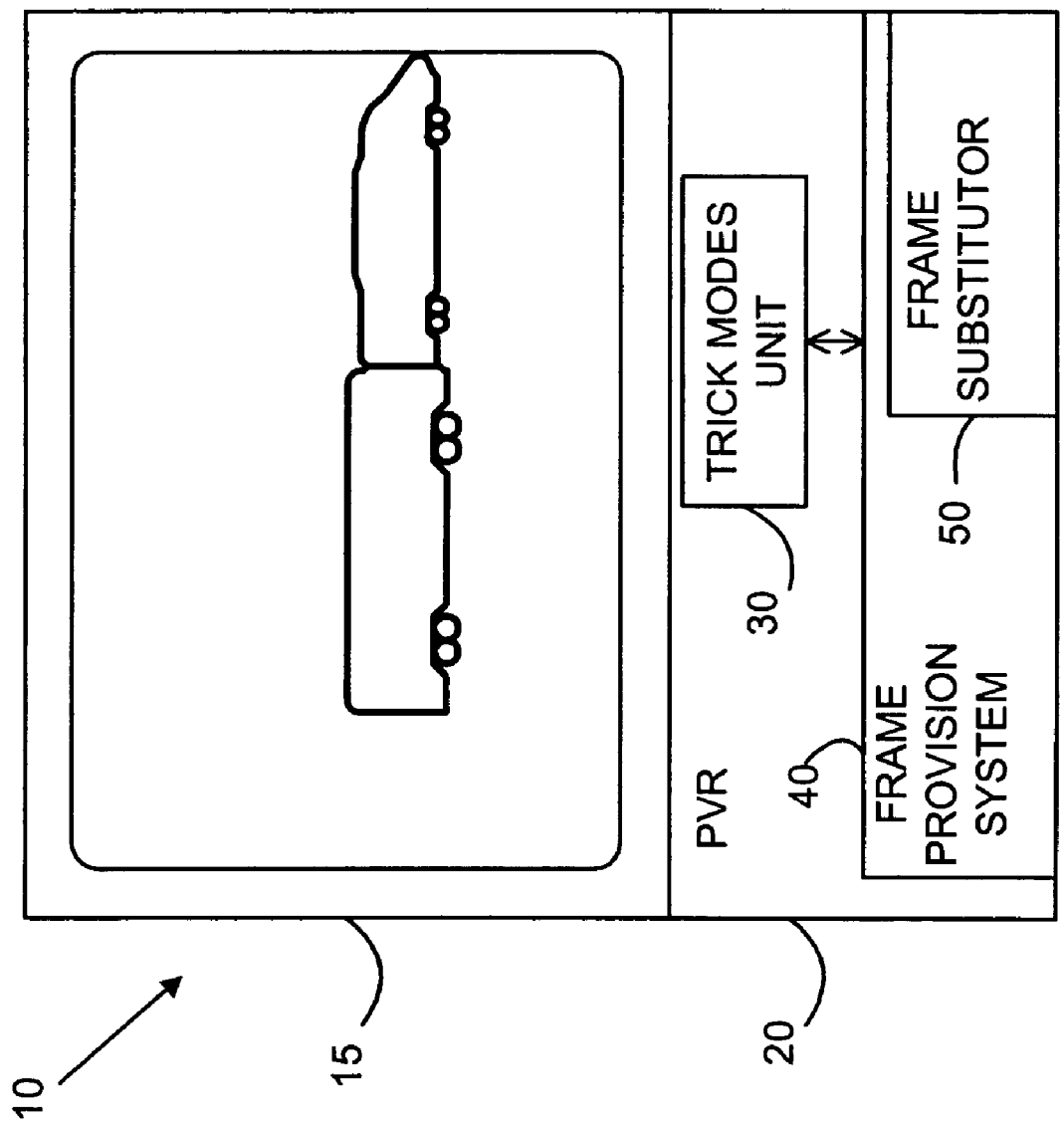
FIG. 1 is a simplified partly pictorial, partly block diagram illustration of a PVR-based television apparatus including a system for providing keys for descrambling content, constructed and operative in accordance with a preferred embodiment of the present invention.

Reference is now made to FIG. 1, which is a simplified partly pictorial, partly block diagram illustration of a PVR-based television apparatus including a system for providing keys for descrambling content, constructed and operative in accordance with a preferred embodiment of the present invention. In the system of FIG. 1, generally designated 10, a television 15 is shown displaying a scene provided for rendering by a personal video recorder (PVR) 20.

The PVR 20 is preferably implemented in any suitable combination of software and hardware, as is well known in the art. The PVR 20 preferably comprises suitable conventional components (not shown), as are well known in the art. Non-limiting examples of conventional PVR systems well known in the art include:

the system described in PCT Published Patent Application WO 00/01149 of NDS Limited, corresponding European Patent 1 013 088 of NDS Limited, and U.S. patent application Ser. No. 09/515,118 of Wachtfogel et al, referred to above; and the XTV™ system, commercially available from NDS Limited, One London Road, Staines, Middlesex TW 18 4EX, United Kingdom.

In addition to conventional components, the PVR 20 preferably comprises a trick modes unit 30, in operative association with a frame provision system 40. The frame provision system 40 preferably comprises a frame substitutor 50.

It is appreciated that various sub-combinations of the apparatus of FIG. 1 may comprise alternative preferred embodiments of the present invention. For example, and without limiting the generality of the foregoing, each of the following may comprise an alternative preferred embodiment of the present invention:

1. the frame provision system 40; and
2. the frame substitutor 50.

The operation of the apparatus of FIG. 1 is now briefly described.

A user (not shown) requests a "trick mode" such as, for example, fast forward or fast reverse rendering of content stored in the PRV 20. For purposes of simplicity of description, fast forward, fast reverse, and other trick modes are sometimes termed herein "fast forward"; persons skilled in the art will appreciate that the invention is not thereby limited.

In order to fulfill the request, the trick modes unit 30 sends a request (not shown in FIG. 1) to provide a list of frames to be displayed to the frame provision system 40.

In an environment such as a home network environment, the request preferably comprises a request from a client to a server to play from a given place at a given speed and direction. Any appropriate protocol known in the art may be used for the request; one particular non-limiting example of a suitable protocol is the well-known RTSP protocol, described, for example in documents published on the World Wide Web (WWW) at www.ietf.org/rfc/rfc2326.txt, and in later drafts found at www.rtsp.org/drafts/. In such a client-server network, the server typically streams video frame data to the client, and supplies ECMs as necessary. Persons skilled in the art will appreciate that, in a home network environment, the frame provision system 40 is typically located in a server remote from the television 15 and that other conventional components (not shown) are provided in order to implement the network.

In a non-server ("local") PVR environment, such as that shown in FIG. 1, speed of fast forward is typically set by an internal call within the PVR, so that a specific protocol need not be used.

The frame provision system 40 preferably performs the following tasks: identification of frames to be rendered in order to fulfill the request; and substitution of another frame for at least one of the identified frames, in order to reduce a total number of key periods for which a frame is to be rendered. The frame provision system 40 then preferably provides a list (not shown in FIG. 1) of frames to be rendered to the trick modes unit 30. While identification of frames to be rendered and substitution of another frame are described throughout the present specification as separate tasks or steps, persons skilled in the art will appreciate that, for purposes of optimized performance, the list may also be produced in a single step.

Figure 2:
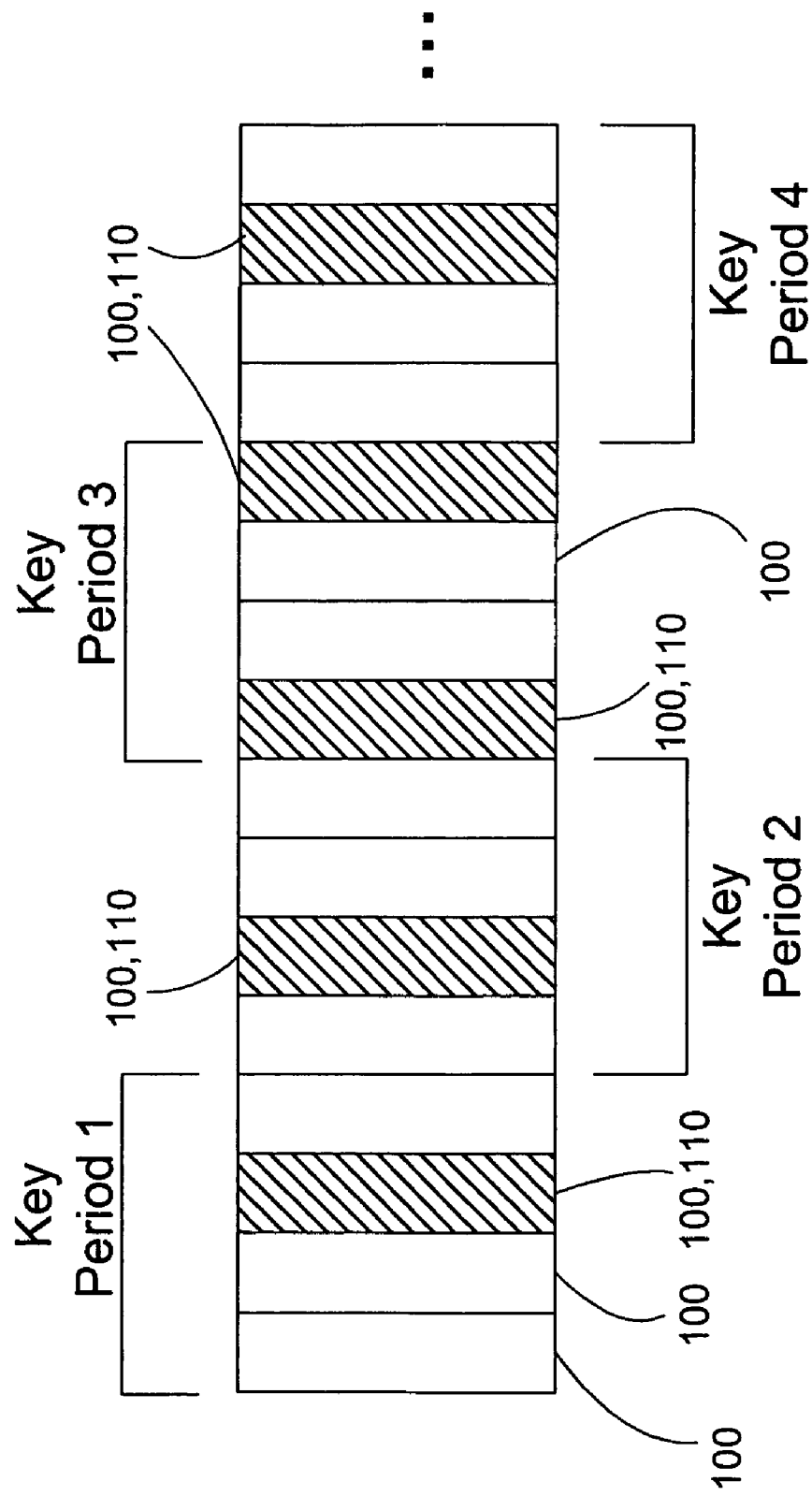
FIG. 2 is a simplified pictorial illustration of scrambled frames comprised in a plurality of key periods, useful for understanding the system of FIG. 1.
Figure 3:
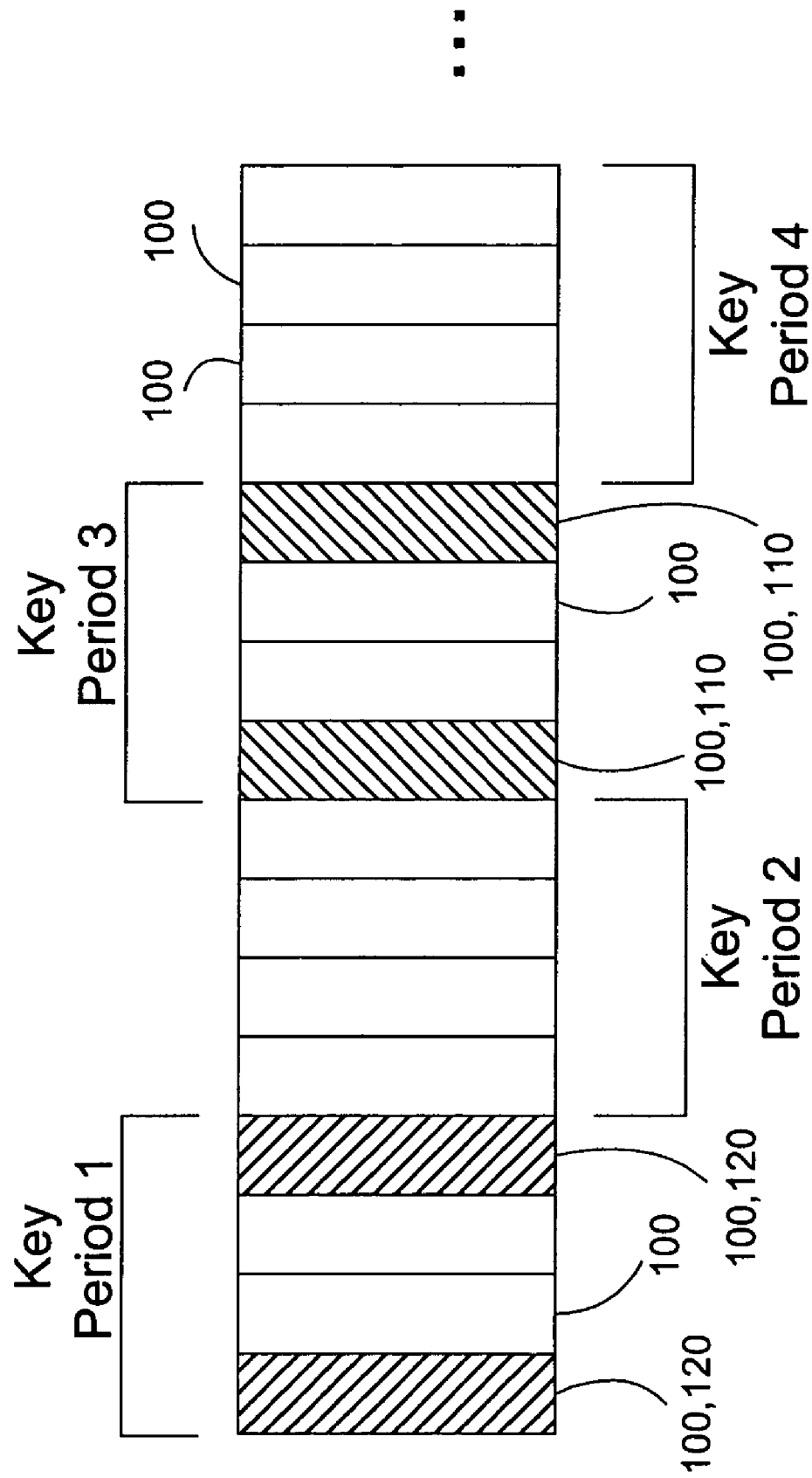
FIG. 3 is a simplified pictorial illustration of scrambled frames comprised in a plurality of key periods, showing substitution of frames to be descrambled in order to reduce a number of key periods for which a frame is to be descrambled, useful for understanding the system of FIG. 1.

Reference is now additionally made to FIG. 2, which is a simplified pictorial illustration of scrambled frames comprised in a plurality of key periods, useful for understanding the system of FIG. 1; and to FIG. 3, which is a simplified pictorial illustration of scrambled frames comprised in a plurality of key periods, showing substitution of frames to be descrambled in order to reduce a number of key periods for which a frame is to be descrambled, useful for understanding the system of FIG. 1.

FIG. 2 depicts, in highly simplified form, frames and their associated key periods. In FIG. 2 four key periods, numbered 1 through 4, are shown, each key period comprising four scrambled frames 100. It is appreciated that the depiction of key periods and scrambled frames 100 in FIG. 1 is highly simplified for purposes of simplicity of depiction and description; in practice, a key period might include, for example, a multiplicity of scrambled frames 100, such as, for example, two hundred scrambled frames 100.

In FIG. 2, a plurality of frames to be descrambled 110 has been identified by the frame provision system 40 of FIG. 1. In, for example, a case of a fast forward request, the frames to be descrambled 110 represent frames to be rendered in order to fulfill the fast forward request.

In the highly simplified example of FIG. 2, one in every three scrambled frames 100 is to be descrambled. Since each key period in FIG. 2 comprises four scrambled frames 100, it will be appreciated that at least one frame to be descrambled 110 is comprised in each key period. Thus, it would be necessary to produce a key for each key period; it is believed that producing a key for each key period might strain the abilities of the system of FIG. 1, as discussed above.

In FIG. 3, some of the frames to be descrambled 110 have been replaced by substituted frames 120, in such a way as to reduce the number of key periods for which a frame is to be descrambled. In the highly simplified example of FIG. 3, the frames to be descrambled (110, 120) are comprised in only two of the four key periods shown. Thus, the necessity to produce keys has been greatly reduced, and so also has the likelihood of straining the abilities of the system of FIG. 1.

It is appreciated that the frames to be descrambled (110, 120) shown in FIG. 3 do not comprise "evenly spaced" frames, as do the frames to be descrambled 110 of FIG. 2. However, the inventors of the present invention believe that, when the frames to be descrambled (110, 120) of FIG. 3 are rendered, a person viewing the frames is unlikely to notice objectionable effects.

It is appreciated that, in actual operation of the system of FIG. 2, selection of frames to show in order to achieve a desired fast forward speed may change dynamically based on system load; for instance, if a disk, network, ECM-providing, or other component is fully loaded at a given time, fewer frames may be shown by jumping further between frames which are shown and/or by reducing the need for ECM processing by skipping entire key periods.

Figure 4:
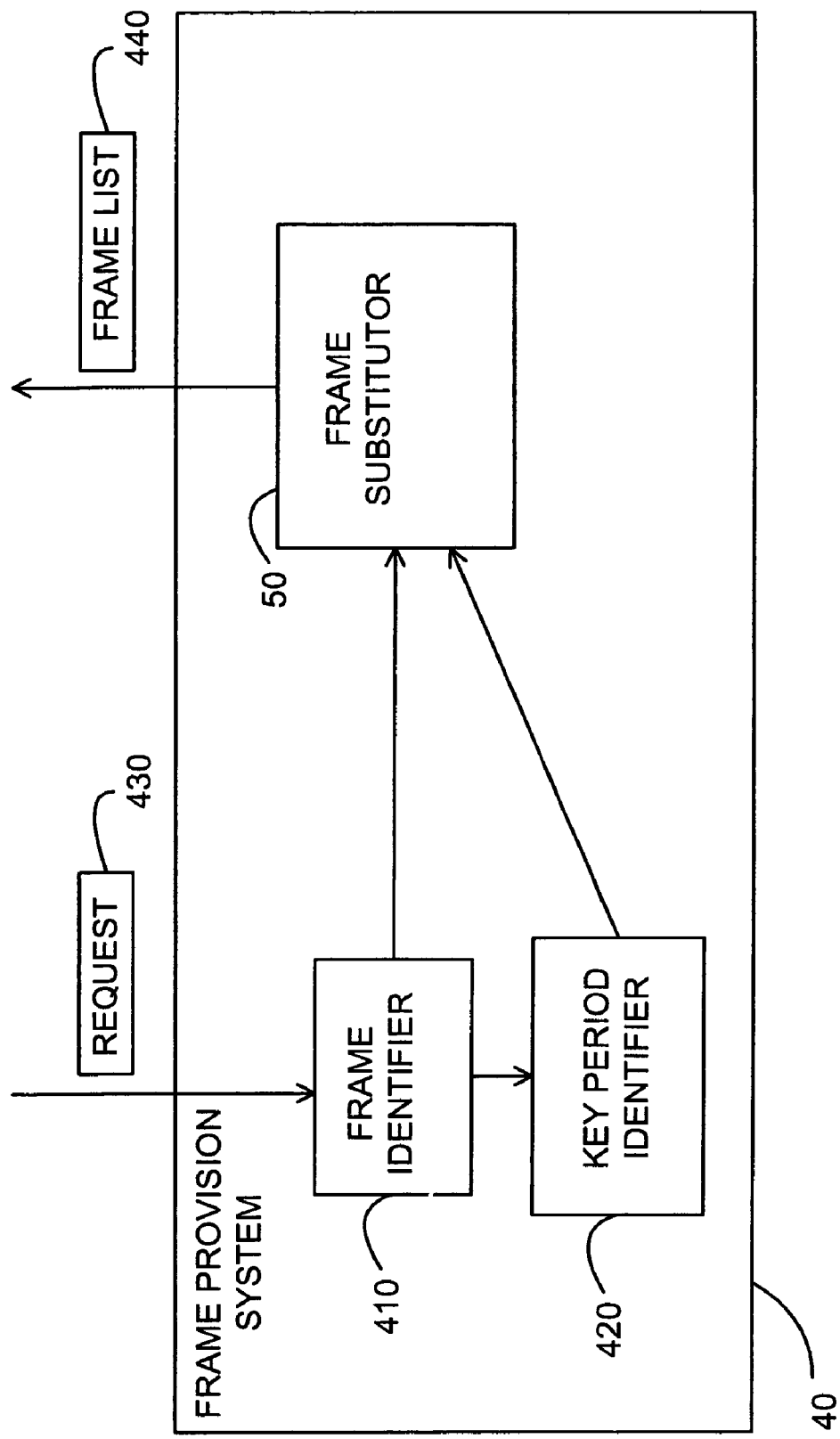
FIG. 4 is a simplified block diagram illustration of a preferred implementation of a portion of the system of FIG. 1.

Reference is now made to FIG. 4, which is a simplified block diagram illustration of a preferred implementation of a portion of the system of FIG. 1, comprising the frame provision system 40. The elements of FIG. 4 are preferably implemented in any suitable combination of hardware and software. It is appreciated that the elements of FIG. 4 are shown and described functionally; persons skilled in the art will appreciate that the elements of FIG. 4 need not be implemented in separate units.

The frame provision system 40 preferably comprises, in addition to the frame substitutor 50, a frame identifier 410 and a key period identifier 420.

The frame provision system 40 receives a request 430 as described above with reference to FIG. 1. The request is sent to the frame identifier 410, which identifies a plurality of frames to be rendered (such as, for example, the frames to be descrambled 110 of FIG. 2).

A list of the frames to be rendered is provided by the frame identifier 410 to the key period identifier 420 and to the frame substitutor 50. The key period identifier 420 preferable identifies a list of key periods to which the list of frames belongs, and provides the list of key periods to the frame substitutor 50.

The frame substitutor 50 preferably utilizes the list of frames provided by the frame identifier 410 and the list of key periods provided by the key period identifier 420 to identify one or more frames to be substituted, as described above with reference to FIG. 1. It is appreciated that, in some cases, in may not be necessary or desirable to substitute any frames, in which case it is preferable that no frames are substituted by the frame substitutor 50. The frame substitutor then provides a frame list 440 for further processing such as, for example, rendering.

Reference is now made to FIG. 5, which is a simplified flowchart illustration of a preferred method of operation of the system of FIG. 1. The method of FIG. 5 preferably comprises the following steps:

A request to perform a trick mode, such as fast forward or fast reverse, is received (step 510). It is appreciated that step 510 is optional, and that the remaining steps of the method of FIG. 5 may be performed without step 510.

A plurality of frames to be descrambled is identified (step 520), preferably as described above with reference to FIGS. 1 and 4. For each of the frames to be descrambled, a key period to which the frame belongs is identified (step 530).

For at least one of the frames to be descrambled, another frame is substituted, in order to reduce the total number of key periods to which the frames belong (step 540), preferably as described above with reference to FIGS. 1 and 4.

Reference is now made to FIG. 6, which is a simplified flowchart illustration of a preferred implementation of a portion of the method of FIG. 5; the method of FIG. 6 comprises a preferred implementation of steps 520, 530, and 540 of FIG. 5. It is appreciated that the method of FIG. 6 comprises one particular preferred embodiments; the method of FIG. 6 is not meant to be limiting.

The method of FIG. 6 preferably comprises the following steps:

A number of key periods to be skipped for each key period to be descrambled is determined (step 610); for example, let the number of key periods to be skipped be denoted KN. As described above, the determination of KN is preferably dynamically based on system load; for instance, if a disk, network, ECM-providing, or other component is fully loaded at a given time, fewer frames may be shown by skipping entire key periods.

A plurality of groups of key periods is determined, each group including one key period to be descrambled and at least one key period to be skipped (step 615). It will be appreciated that, in general, each such group will include KN key periods to be skipped.

A number N of frames that should be provided, for example, provided for rendering, for each group of key periods is determined (step 620). A preferred method for determining N is as follows (with "*" representing multiplication and "/" representing division):

1. Let M be a number such that, for the given fast forward (or other trick mode) request being processed, 1 in M frames is to be rendered.
2. Let K be the number of frames in each key period; persons skilled in the art will appreciate that, in practice, K may be the approximate number of frames in each key period, since the number of frames in a key period may differ from one key period to another key period.
3. The inventors of the present invention believe it is reasonable, in the presently describe preferred method, to assume that: $2*M<K*(KN+1)$; equivalently, it is reasonable to assume that at least two frames are to be descrambled for each group of key periods.
4. N is preferably computed as:

$$N=(KN+1)*K/M$$

For each group of key periods in step 620, N frames are chosen to be provided or rendered; the N frames are chosen from within the one key period to be descrambled for that group of key periods (step 630).

A preferred method for choosing the N frames in the one key period to be descrambled is as follows:

1. Let F be the number of the first frame in the key period.
2. Let L be the number of the last frame in the key period.
3. Choose F and L as 2 of the frames to be descrambled. If N=2, the preferred method for choosing the N frames terminates. Otherwise:
4. Divide the range F . . . L into N−1 parts and choose frames "evenly spaced" within the range.

Another way of expressing the preferred method for choosing the N frames in the one key period to be descrambled is as follows:

The frames to decode are frames numbered:

$$F+(X-1)*(L-F)/(N-1)$$

where X ranges from 1 to N.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A computer-implemented method for processing scrambled content, the scrambled content being divided into frames, the method comprising:

identifying a plurality of frames to be descrambled;

for each frame of the plurality of frames, identifying a key period associated with a key for descrambling the frame; and for at least one frame f of the plurality of frames:

substituting a substitute frame g for the frame f, the substitute frame g being chosen in order to reduce a total number of key periods associated with keys for descrambling all of the plurality of frames, wherein the substituting comprises:

determining a first number of key periods to be skipped for each key period to be descrambled, the first number being greater than or equal to 1;

determining a plurality of groups of key periods, each group including one key period to be descrambled and the first number of key periods to be skipped;

determining a second number of frames to be provided from each group of the plurality of groups of key periods; and for each one group of the plurality of groups of key periods, choosing the second number of frames to be provided from within the one key period to be descrambled, the one key period being comprised in the one group.

2. The method according to claim 1 and also comprising: producing one key for each key period.

3. The method according to claim 1 and also comprising: producing exactly one key for each key period.

4. The method according to claim 2 and wherein the producing comprises producing from an ECM.

5. The method according to claim 3 and wherein the producing comprises producing from an ECM.

6. The method according to claim 1 and also comprising: rendering at least one of the plurality of frames.

7. The method according to claim 6 and wherein the rendering comprises rendering all of the plurality of frames.

8. The method according to claim 1 and wherein the second number is greater than or equal to 2.

9. The method according to claim 8 and wherein the second number of frames are evenly spaced within the one key period.

10. A computer-implemented method for processing scrambled content, the scrambled content being divided into frames, the method comprising:

identifying a plurality of frames to be descrambled;

for each frame of the plurality of frames, identifying a key period associated with a key for descrambling the frame; and reducing a total number of key periods associated with keys for descrambling all of the plurality of frames by performing the following:

for each frame f of the plurality of frames:

determining whether to substitute a substitute frame g for the frame f based, at least in part, on a distance between frame g and frame f, and based, at least in part, on the identified key period associated with frame g and the identified key period associated with frame f; and based on a result of the determining, substituting frame g for frame f.

11. The method according to claim 10 and also comprising:

producing one key for each key period.

12. The method according to claim 10 and also comprising:

producing exactly one key for each key period.

13. The method according to claim 11 and wherein the producing comprises producing from an ECM.

14. The method according to claim 12 and wherein the producing comprises producing from an ECM.

15. The method according to claim 10 and also comprising:

rendering at least one of the plurality of frames.

16. The method according to claim 15 and wherein the rendering comprises rendering all of the plurality of frames.

17. Apparatus for processing scrambled content, the scrambled content being divided into frames, the apparatus comprising:
- a frame identifier identifying a plurality of frames to be descrambled;
- a key period identifier operative, for each frame of the plurality of frames, to identify a key period associated with a key for descrambling the frame; and
- a frame substitutor operative, for at least one frame f of the plurality of frames, to substitute a substitute frame g for the frame f, the substitute frame g being chosen in order to reduce a total number of key periods associated with keys for descrambling all of the plurality of frames, the frame substitutor being operative to:
  - determine a first number of key periods to be skipped for each key period to be descrambled, the first number being greater than or equal to 1;
  - determine a plurality of groups of key periods, each group including one key period to be descrambled and the first number of key periods to be skipped;
  - determine a second number of frames to be provided from each group of the plurality of groups of key periods; and
  - for each one group of the plurality of groups of key periods, choose the second number of frames to be provided from within the one key period to be descrambled, the one key period being comprised in the one group.

18. Apparatus for processing scrambled content, the scrambled content being divided into frames, the apparatus comprising:
- a frame identifier identifying a plurality of frames to be descrambled;
- a key period identifier operative, for each frame of the plurality of frames, to identify a key period associated with a key for descrambling the frame; and
- a frame substitutor operative to reduce a total number of key periods associated with keys for descrambling all of the plurality of frames by performing the following:
  - for each frame f of the plurality of frames:
    - determining whether to substitute a substitute frame g for the frame f based, at least in part, on a distance between frame g and frame f, and based, at least in part, on the identified key period associated with frame g and the identified key period associated with frame f; and
    - based on a result of the determining, substituting frame g for frame f.

19. Apparatus for processing scrambled content, the scrambled content being divided into frames, the apparatus comprising:
- means for identifying a plurality of frames to be descrambled;
- means for identifying, for each frame of the plurality of frames, a key period associated with a key for descrambling the frame; and
- means for substituting, for at least one frame f of the plurality of frames, a substitute frame g for the frame f, the substitute frame g being chosen in order to reduce a total number of key periods associated with keys for descrambling all of the plurality of frames, the means for substituting performing the following:
  - determining a first number of key periods to be skipped for each key period to be descrambled, the first number being greater than or equal to 1;
  - determining a plurality of groups of key periods, each group including one key period to be descrambled and the first number of key periods to be skipped;
  - determining a second number of frames to be provided from each group of the plurality of groups of key periods; and
  - for each one group of the plurality of groups of key periods, choosing the second number of frames to be provided from within the one key period to be descrambled, the one key period being comprised in the one group.

20. Apparatus for processing scrambled content, the scrambled content being divided into frames, the apparatus comprising:
- means for identifying a plurality of frames to be descrambled;
- means for identifying, for each frame of the plurality of frames, a key period associated with a key for descrambling the frame; and
- means for reducing a total number of key periods associated with keys for descrambling all of the plurality of frames by performing the following for each frame f of the plurality of frames:
  - determining whether to substitute a substitute frame g for the frame f based, at least in part, on a distance between frame g and frame f, and based, at least in part, on the identified key period associated with frame g and the identified key period associated with frame f; and
  - based on a result of the determining, substituting frame g for frame f.

* * * * *